Dec. 1, 1936.  R. D. R. SCULL  2,062,732
PLATE GLASS TURNOVER AND TRANSFER APPARATUS
Filed Jan. 30, 1936   5 Sheets-Sheet 4

INVENTOR
R.D.R.SCULL
BY
Bradley + Bee
ATTORNEYS.

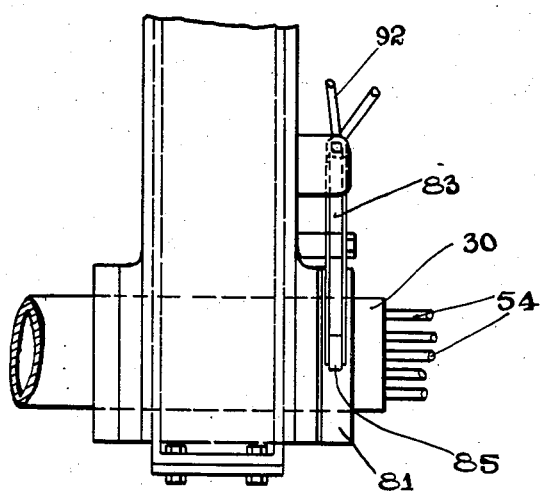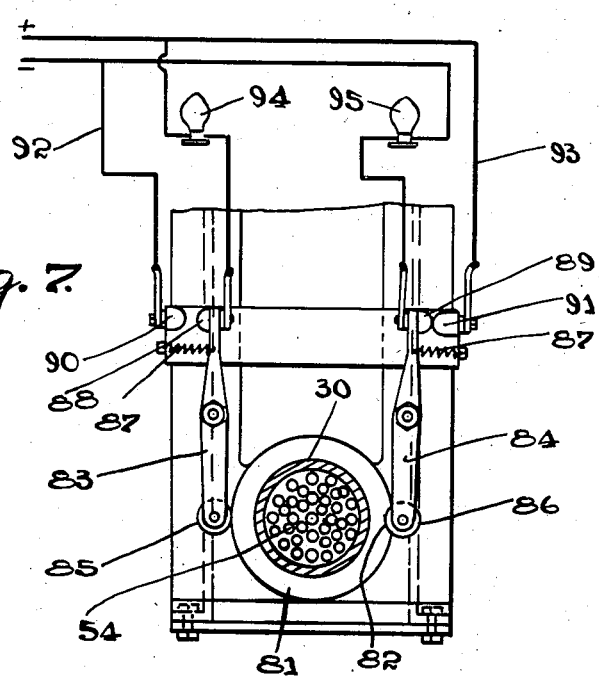

Patented Dec. 1, 1936

2,062,732

UNITED STATES PATENT OFFICE 2,062,732

PLATE GLASS TURNOVER AND TRANSFER APPARATUS

R. D. Russell Scull, Crystal City, Mo., assignor to Pittsburgh Plate Glass Company, Allegheny County, Pa., a corporation of Pennsylvania Application January 30, 1936, Serial No. 61,514

3 Claims. (Cl. 212—11)

The invention relates to transfer and turnover apparatus for use in a grinding and polishing system, such as that shown in the Fox Patent No. 1,554,804, dated September 22, 1925. The invention has for its principal objects the provision of an improved apparatus for removing glass sheets from the grinding tables or cars on one track, turning them upside down and transferring them in this position to the tables or cars on a parallel track. More specifically, the objects of of the invention are to provide an apparatus of the character stated, which permits the transfer and turnover steps to be accomplished quickly and with a minimum of breakage, which can be used with parts of glass sheets as well as those of standard size, and in which the space required for installation and operation is reduced as compared with apparatus heretofore used having a similar function.

Figure 1:
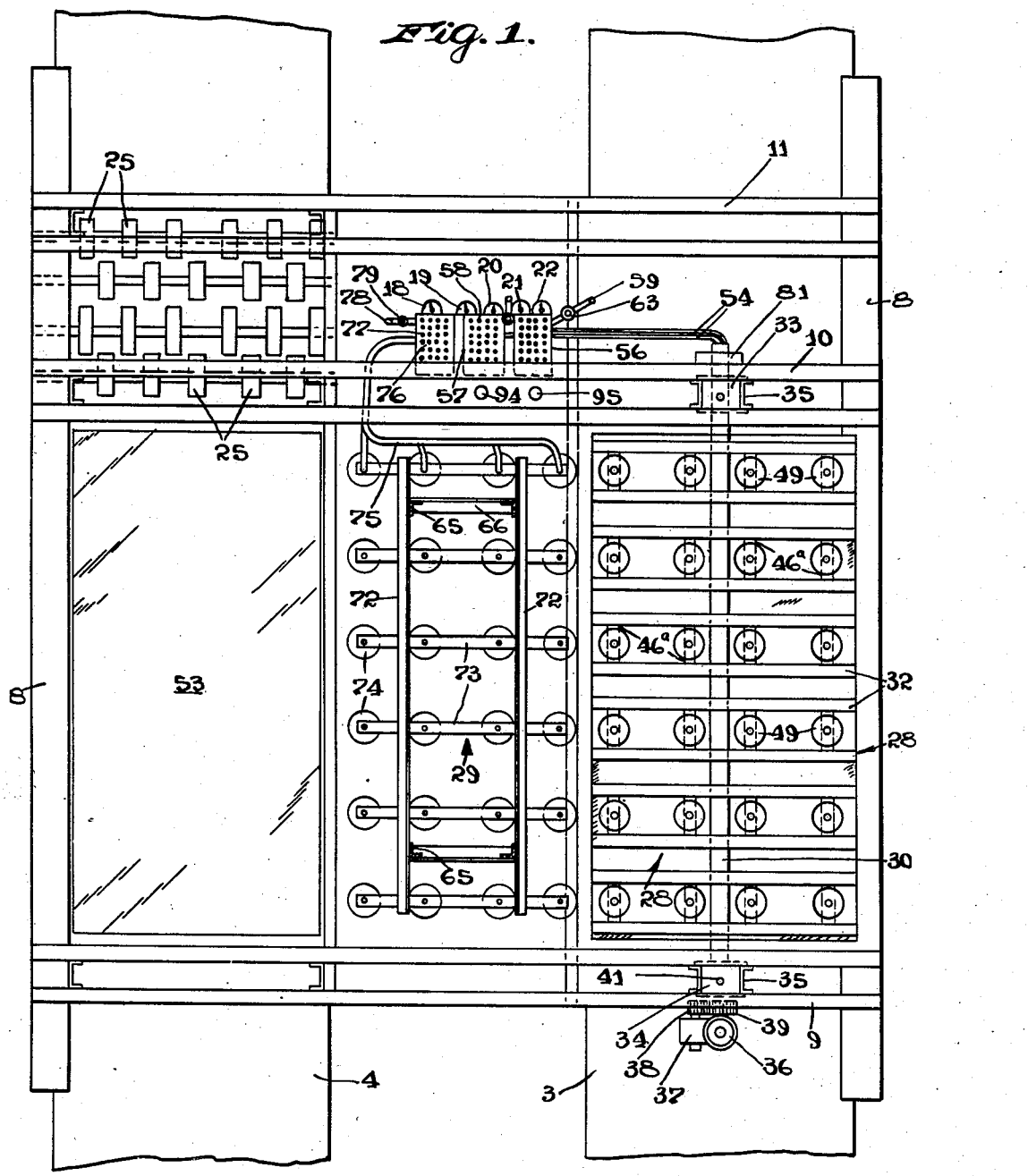
Figure 2:
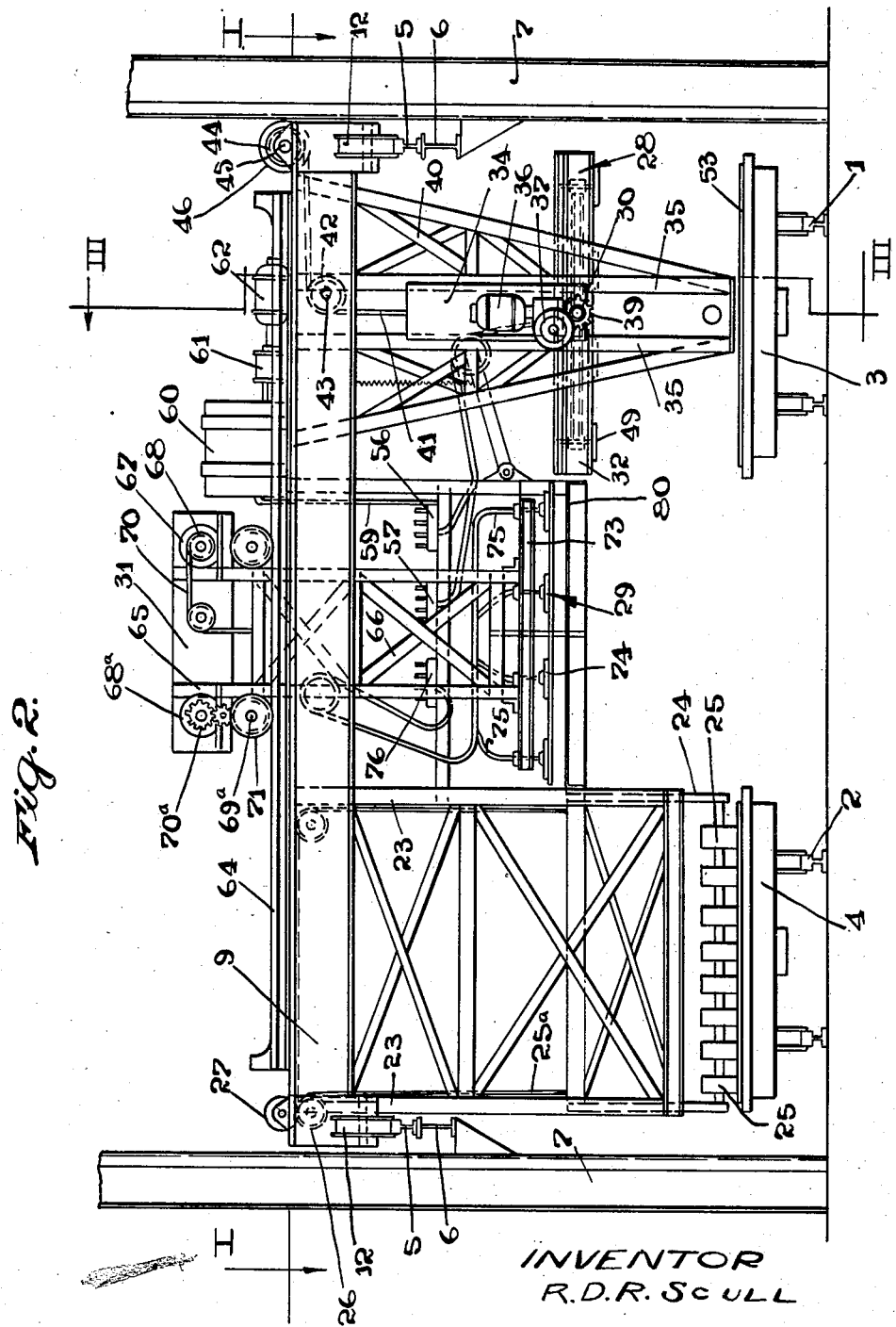
Figure 3:
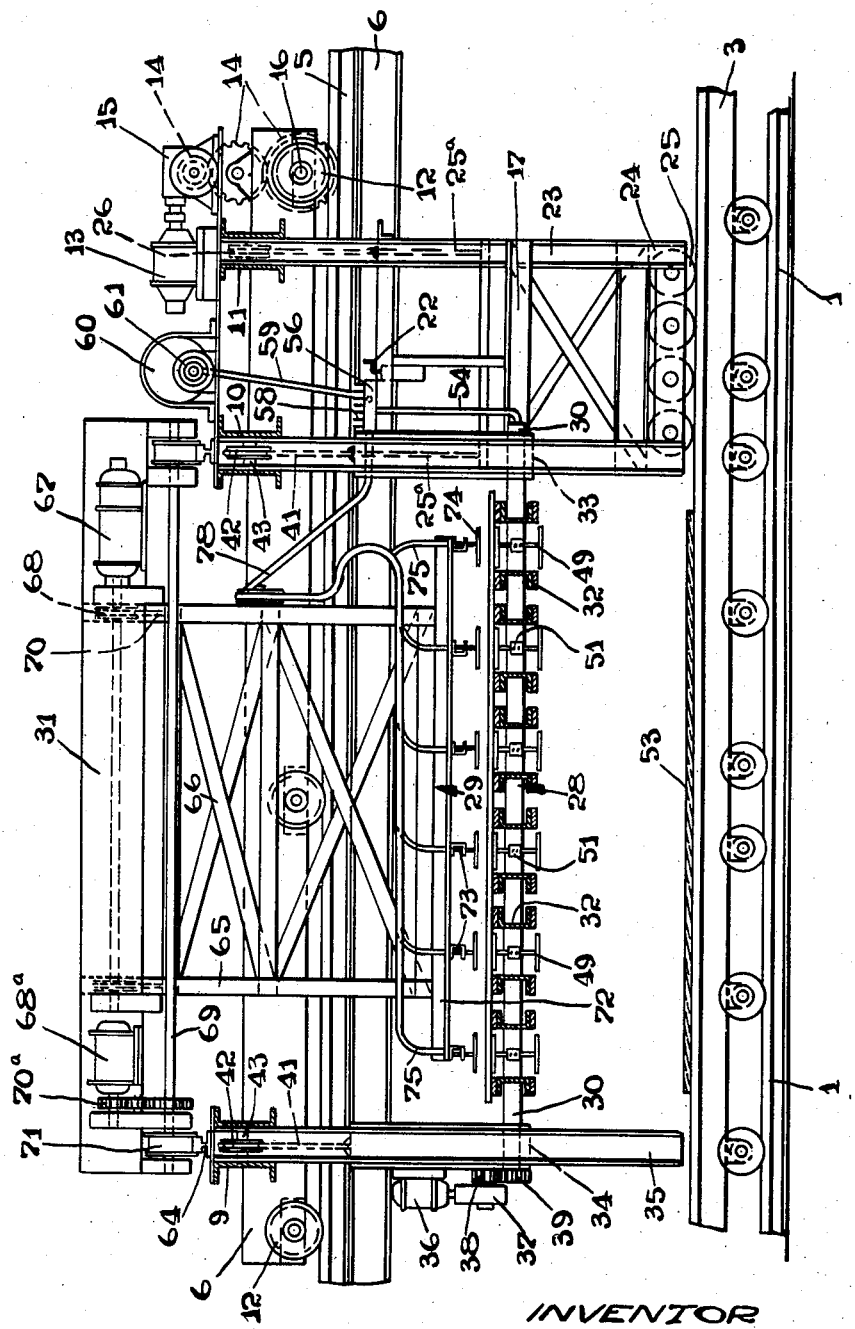
Figure 4:
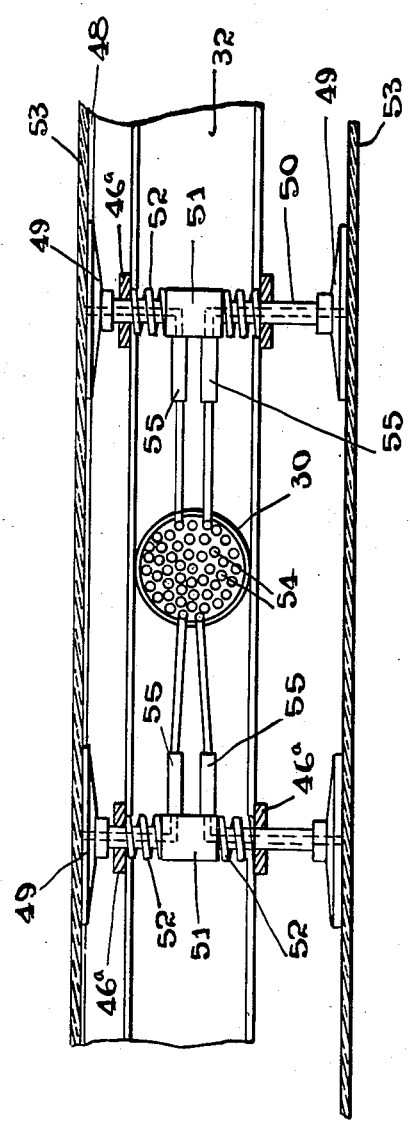
Figure 5:
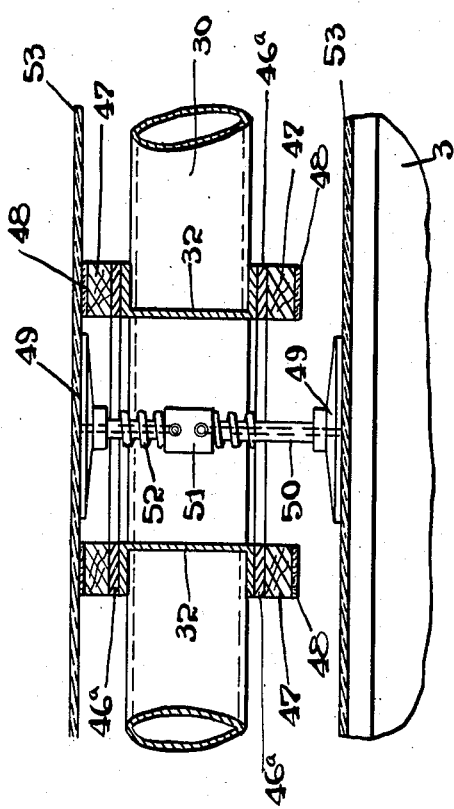

Briefly stated, the apparatus comprises a crane movable longitudinally of the parallel grinding tracks and provided with two vertically movable vacuum frames. One of these frames is rotatable about a central horizontal axis lying above one track parallel with the center line and has vacuum cups on both sides, this frame being used to lift the glass sheet from a table on one track and turn it upside down. The other vacuum frame is movable horizontally in the crane from a position over the first vacuum frame to a position over the tables on the track to which the glass sheet is to be transferred. This frame is brought over the turned over sheet on the first frame and after picking it up, is moved to a position over one of the tables on the other track where the frame is lowered until the glass sheet carried thereby rests on the table. The construction and operation will be clear from the accompanying drawings, wherein:

Figure 1 is a plan view at the level I—I of Fig. 2. Fig. 2 is an end view. Fig. 3 is a section on the line III—III of Fig. 2. Figs. 4 and 5 are detail views of the vacuum cup mounting, the views being sections taken at right angles to each other. And Figs. 6 and 7 are detail views of the indicator construction, Fig. 6 being a side elevation, and Fig. 7 a transverse section.

Referring to the drawings, 1 and 2 are the work tracks of the system, which carry the two series of grinding and polishing tables 3 and 4, such tracks each extending beneath a series of grinding and polishing machines. The apparatus, whose description follows, is designed to remove the glass sheets which have been ground and polished on one side on the tables 3, turn such sheets upside down and place them on the tables 4 where they are bedded in plaster preliminary to grinding and polishing the rough sides of the sheets which are now uppermost. Extending longitudinally of the work tracks are a pair of rails 5, 5 mounted upon the I-beams 6, 6, which are in turn secured to the posts 7, 7, constituting a part of the framework of the building in which the apparatus is mounted. These rails constitute the track for a crane which carries the transfer apparatus. The framework of this crane is made up of the longitudinal channels 8, 8 tied together by three transverse beams 9, 10, and 11, each consisting of a pair of parallel channels, as indicated in Fig. 3. The framework carries six wheels 12, which ride on the track, and one pair of these wheels is driven from a motor 13 (Fig. 3) through the intermediary of the gears 14 and reduction gearing in the casing 15. The lower of the three gears 14 is keyed to the shaft 16, which extends transversely of the crane and carries the wheels 12, 12. The movement of the crane as well as the operations later described involving the vacuum frames, is controlled by the operator standing on the platform 17 suspended from the framework of the crane, the control being effected by means of one of the five controllers 18, 19, 20, 21, and 22, shown in Fig. 1, and located on suitable brackets in front of the operator.

Also suspended from the crane 1 is a guide frame 23 in which is slidably mounted for vertical movement, a frame 24 carrying a plurality of rolls 25. After the glass has been transferred to the tables 4 and laid thereon in plaster, the tables with the glass sheets thereon move beneath the roller frame 24 so that the pressure of the rolls beds the glass in the plaster. This result may also be accomplished by moving the crane longitudinally of the series of cars since this gives the necessary relative movement. The frame 24 is supported for vertical movement by means of a pair of cables 25a, which are secured at their upper ends to the drum 26. This drum is rotated from a motor 27 carried by the frame through the intermediary of suitable reduction gearing interposed between the shaft of the motor and the shaft of the drum. The apparatus for bedding the glass sheet is not new, but is necessarily carried by the overhead crane which carries the other apparatus, so that it is shown and described merely to make clear the complete apparatus in its preferred form. It will be understood that the motor 27 is controlled by the operator from one of the controllers 18 to 22.

Mounted upon the crane framework, as heretofore described, are a pair of vacuum frames 28 and 29, the vacuum frame 28 being two-sided and rotatable upon a pipe 30, so that either set of vacuum cups may be presented toward the tables therebeneath. This frame is for lifting the glass sheets from the tables 3 and turning them over preliminary to transferring them to the tables 4. The vacuum frame 29, which is shown in midposition, is carried upon a carriage 31 mounted for movement transversely of the two tracks so that it may be brought over the top of the vacuum frame 28 and also moved to the left (Fig. 2) so that it lies directly above the track 2. This frame is also mounted for vertical movement. It will be apparent from the foregoing that the frame 29 may be utilized to pick up a sheet from the vacuum frame 28, move it to the left and deposit it upon one of the tables 4, thus completing the turnover and transfer operation.

The vacuum frame 28 comprises the pipe 30, to which are rigidly secured the arms 32, which are in the form of channels, as indicated in Fig. 5. The pipe is mounted for rotation at its ends in a pair of slide bars 33, 34, which are guided vertically in a frame made up of the channels 35, 35. Also mounted on one of the slide bars is means for rotating the pipe comprising the motor 36, reduction gearing in the casing 37 and the gears 38 and 39, the latter of which is keyed to the end of the pipe. The guideways for the side bars, which consist of the channels 35, 35 are secured at their upper ends to the members 9 and 10 and are braced at their lower ends and intermediate such ends by a triangular framework (Fig. 2) made up of the angle irons 40, shown in Fig. 2. The upper ends of the side bars have cables 41 attached thereto passing over pulleys 42, 42 mounted on a shaft 43 and then around drums 44 which are mounted on a shaft 45 driven from a motor 46 through the intermediary of suitable reduction gearing. Means are thus provided for raising and lowering the vacuum frame. When the frame is lifted to the position shown in Fig. 2, it may be turned over to reverse the position of the glass sheet carried by the lower face of the frame through the actuation of the motor 36. The operation of the motors 36 and 46 is governed by the operator through the actuation of two of the controllers 18 to 22 heretofore referred to.

The arrangement of the vacuum cups will be seen by reference to Figs. 4 and 5, which also shows in detail the construction of the frame. As here shown, the pairs of channels 32, between which the shanks of the vacuum cups are mounted, are provided with a series of transverse strips 46a secured to the channels through which the shanks of the vacuum cups are adapted to slide. These strips are attached to the flanges of the channels, adding additional security to the structure. Mounted upon the flanges of the channels are strips 47 of wood having their outer faces covered with strips 48 of felt. Each pair of vacuum cups 49 is connected to a hollow shank 50 attached at its inner end to a block 51. A pair of springs 52, 52 lying between the block 51 and the guide strips 46a serve to maintain the cups normally with their faces in advance of the faces of the vacuum frame. When the vacuum frame is reversed in position, so that the glass sheet 53 lies above the frame, its weight is such as to compress one of the springs 52, so that the glass sheet rests upon the felt strips on the upper sides of the bars 47. A firm support for the glass sheet is thus provided when the time comes to apply a second vacuum frame to the glass sheet in order to transfer it to the tables 4, as later described.

The pipe 30 carries a plurality of vacuum tubes 54, one for each of the vacuum cups, connection being made between such tubes and the shanks of the cups by means of the connections 55, 55, as indicated in Fig. 4, the outer ends of the connections being attached to nipples on the blocks 51, which lead to the interiors of the two shanks. The ends of the tubes 54 extend through the open end of the pipe 30 adjacent the operator's platform and lead up to the boards 56 and 57, where a valve 58 is provided for each connection, so that any one of the connections may be closed off when occasion requires. Each of the connections has communication through the pipe 59 with a vacuum tank 60. This vacuum tank is exhausted by means of the pump 61 operated by the motor 62. Each of the pipes 59 is provided with a valve 63, so that when all of the individual valves 56 or 57 are open, it is necessary only to operate the main valve, such as the valve 63, in order to apply vacuum to the cups or to release it therefrom. It will be understood that these main valves are three-way valves, so that air may be supplied to the vacuum cups or cut off therefrom and the cups may be connected with the atmosphere to release the vacuum when desired, the use of three-way valves in connection with vacuum systems being well known in the art.

The carriage 31, which supports the transfer vacuum frame 29, rides upon rails 64 and carries a depending frame made up of the angles 65, which act as guides for a frame 66 carrying the vacuum frame at its lower end. The vacuum frame is raised and lowered from a motor 67, which drives drums 68, to which the cables 70 are attached, such cable being secured at its upper end to the frame 66. The carriage itself is moved back and forth along its track by means of a motor 68a, which drives the shaft 69a through the intermediary of the gears 70a. Two wheels 71 of the carriage are keyed to the shaft 69 so that the operation of the motor moves the carriage along its track. The motors 67 and 68a are governed by the operator from one of the controllers 18 to 22. The vacuum frame 29 is made up of the two longitudinal bars 72 (Fig. 1) and the transverse bars 73, which transverse bars have attached to their lower sides the vacuum cups 74. The vacuum cups are exhausted by means of suitable tubing 75 leading to the board 76. Each of the tubes has an individual valve 77 on the board by means of which it can be cut off from the system. The main supply pipe 78 which leads to the vacuum tank 60 is provided with a three-way control valve 79 for governing the application of vacuum to all of the cups at one time and the release thereof when it is desired to deposit the glass sheet carried by the cups. A screen 80 (Fig. 2) is provided intermediate the two tracks to act as a safety shield for the space below when a glass sheet is being transferred from the vacuum frame 28 to one of the tables 4.

In order to indicate the position of rotation of the frame 28, the signaling device shown in Figs. 6 and 7 is provided. The pipe 30 carries a cam 81 having a recess 82 therein, and such cam is engaged by a pair of levers 83 and 84 carrying rollers 85 and 86 at their ends which are yieldingly held in engagement with the cam by means of the tension springs 87. The upper ends of the levers are provided with contacts 88 and 89 adapted to engage other contacts 90 and 91. Circuits 92 and 93 are provided through the pairs of contacts with a red light 94 in one circuit and a green light 95 in the other circuit. When the cam is in the position shown in Fig. 7, the contacts 89 and 91 are in engagement and the green light shows. When the frame is rotated through an angle of 180 degrees, the roller 85 is received by the recess 82 and the red light shows. The lights are located just in front of the valve boards 56 and 57 (Fig. 1) in front of the operator and gives him a check upon the position of the vacuum frame 28, and as to the proper valve to operate, the recess 82 being so positioned that one of the lights shows when the frame is in horizontal or operative position.

In the operation of the apparatus to remove a glass sheet from one of the tables 3, and transfer it to one of the tables 4, the operator brings the frame to position over the table 3, and then operates the motor 45 to lower the frame so that the vacuum cups on the lower side thereof engage the glass sheet, at which time the operator actuates one of the valves 59 to exhaust the air from the cups. The frame is then raised to the position shown in Fig. 2 and rotated through 180 degrees by means of the motor 36, thus bringing the glass sheet to the top side of the frame. The carriage 31 is now moved to the right from the position of Fig. 2 until it occupies the position directly over the frame 28, at which time the motor 67 is operated to lower the frame and engage the glass sheet. The cups on the frame 29 are now exhausted, so that they engage the glass sheet and the vacuum on the cups of the frame 30 is released. The frame 29 is now moved to the left on its carriage until it arrives over one of the tables 4, at which time the motor 67 is operated to lower the frame and deposit the glass sheet upon the table by releasing the vacuum cups. During this movement of the frame 29, the operation with respect to the vacuum frame 28 is repeated to pick up another glass sheet, raise the frame to the position of Fig. 2, and turn the frame over to bring the glass sheet uppermost. Two vacuum frames are thus occupied in their movements at the same time so that rapid operation is insured. The frame 28 is preferably oscillated back and forth through an angle of 180 degrees, instead of being completely rotated, this being an advantageous procedure because of the flexible vacuum tube connections which have sufficient play to permit the back and forth movement, but would require swivels if the frame were rotated in only the one direction.

If desired, the operation of the entire apparatus can be made automatic to a large extent, and electrically operated valves might be employed in place of the hand operated vacuum valves, but this is a matter of detail which may be readily applied by those skilled in the art.

The apparatus is capable of taking care of transfer operations of a two-track system, such as that shown, operating at the maximum capacity of the two grinding and polishing systems, so that no delay occurs at this point in the operation. The apparatus is all under the control of one operator who rides on the crane, no great amount of skill being necessary because of the character of the apparatus. The apparatus will handle not only full-size sheets, but also smaller sections of glass which, because of breakage, may require transfer. This handling operation of smaller sheets may be accomplished by cutting out of operation at the boards 56 and 57 those vacuum cups on both frames which are not covered by the face of the glass sheet.

What I claim is:

1. In glass sheet turnover and transfer apparatus for a grinding and polishing system comprising a pair of parallel work tracks carrying cars on which the glass sheets are ground and polished, a vacuum frame mounted for vertical movement above one track and adapted to swing about a horizontal axis which is parallel with and directly over the center line of the track through an angle of 180 degrees so that it may present either face to the car therebeneath in parallel with the top of such car, vacuum cups carried on both sides of the frame so that a glass sheet may be lifted from the car beneath when the frame is in either of its two positions of rotary adjustment, a carriage mounted above the tracks for movement transverse thereof from a position over said vacuum frame to a position over the track on which is mounted the car to which the glass sheet is to be transferred, a horizontal vacuum frame supported on the carriage for vertical movement and provided on its lower side with vacuum cups and means for moving both vacuum frames vertically.

2. In glass sheet turnover and transfer apparatus for a grinding and polishing system comprising a pair of parallel work tracks carrying cars on which the glass sheets are ground and polished, a crane mounted above the tracks for movement longitudinally thereof, a vacuum frame on the crane above one track and movable up and down and adapted to swing about a horizontal axis which is in parallel with and directly over the center line of the track through an angle of 180 degrees so that it may present either face to the car therebeneath in parallel with the top of such car, vacuum cups carried on both sides of the frame, a carriage mounted on the crane for movement transversely of the tracks from a position over said vacuum frame to a position over the track on which is mounted the car to which the glass sheet is to be transferred, a horizontal vacuum frame supported on the carriage for vertical movement and provided on its lower side with vacuum cups, and means for moving both vacuum frames vertically.

3. In glass sheet turnover and transfer apparatus for a grinding and polishing system comprising a pair of parallel work tracks carrying cars on which the glass sheets are ground and polished, a vacuum frame mounted for vertical movement above one track and adapted to swing about a horizontal axis through an arc of 180 degrees so that it may present either face to the car therebeneath in parallel with the top of such car, vacuum cups carried on the frame, spring means behind each cup for normally maintaining the cups with their faces forward of the frame, but adapted to yield and permit the glass sheet carried by the cups to rest on the frame when the frame is turned so that the sheet lies above the frame, and a second vertically movable vacuum frame mounted for movement transversely of the tracks from a position over the first vacuum frame to a position over the track on which is mounted the car to which the glass sheet is to be transferred, and means for moving both vacuum frames vertically.

R. D. RUSSELL SCULL.